(12) United States Patent
Rad

(10) Patent No.: US 10,565,452 B2
(45) Date of Patent: *Feb. 18, 2020

(54) VIRTUAL REALITY SYSTEM AND KIT

(71) Applicant: Steve Rad, Laguna Niguel, CA (US)

(72) Inventor: Steve Rad, Laguna Niguel, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/561,744

(22) Filed: Sep. 5, 2019

(65) Prior Publication Data

US 2019/0392218 A1    Dec. 26, 2019

Related U.S. Application Data

(63) Continuation-in-part of application No. 16/294,706, filed on Mar. 6, 2019, now Pat. No. 10,430,658, which is a continuation-in-part of application No. 16/153,525, filed on Oct. 5, 2018.

(60) Provisional application No. 62/569,344, filed on Oct. 6, 2017.

(51) Int. Cl.
| | |
|---|---|
| *G06K 9/00* | (2006.01) |
| *G09B 19/24* | (2006.01) |
| *G09B 5/06* | (2006.01) |
| *G06F 1/16* | (2006.01) |

(52) U.S. Cl.
CPC ......... *G06K 9/00671* (2013.01); *G06F 1/163* (2013.01); *G09B 5/065* (2013.01); *G09B 19/24* (2013.01)

(58) Field of Classification Search
None
See application file for complete search history.

(56) References Cited

U.S. PATENT DOCUMENTS

| | | | | |
|---|---|---|---|---|
| 9,679,547 | B1 * | 6/2017 | Zund | ........................ G06K 9/78 |
| 2017/0352187 | A1 * | 12/2017 | Haines | .................... G06F 16/48 |

* cited by examiner

*Primary Examiner* — YuJang Tswei
(74) *Attorney, Agent, or Firm* — Jeffer Mangels Butler & Mitchell LLP; Brennan C. Swain, Esq.

(57) ABSTRACT

A virtual reality system that includes a printed media member that has at least a first image target, a head mounted device that includes a mobile device securing member, and software that is configured to run on a mobile device that includes a camera that has a camera lens. The software is in communication with a target database (either on a remote server or within the software) that includes information related to the first image target, and wherein the software includes first virtual reality content that is associated with the first image target.

20 Claims, 12 Drawing Sheets

VIRTUAL REALITY SYSTEM AND KIT

CROSS REFERENCE TO RELATED APPLICATIONS

This application is a continuation of U.S. patent application Ser. No. 16/294,706, filed Mar. 6, 2019, which is a continuation-in-part of U.S. patent application Ser. No. 16/153,525, filed Oct. 5, 2018, which claims the benefit of U.S. Patent Application No. 62/569,344, filed Oct. 6, 2017, the entireties of which are incorporated by reference herein.

FIELD OF THE INVENTION

The present invention relates generally to an augmented and virtual reality system and kit, and, more particularly to an augmented and virtual reality system that allows a user to perform a series of actions using a printed media member and associated instruments.

BACKGROUND OF THE INVENTION

Virtual reality and augmented reality systems have become increasingly popular in recent years. For example, prior art AR utilizes a tablet or mobile device in full screen mode, allowing the user to augment something in front of them, e.g., snapchat face filters. However, when using face filters and the like, the user typically has their phone in one hand. In the present invention, the smartphone is placed in the googles with the camera lens exposed so that the user can be hands-free. Furthermore, the app shows the video in split screen mode so that it can be viewed properly on the goggles.

SUMMARY OF THE PREFERRED EMBODIMENTS

In accordance with a first aspect of the present invention there is provided a method of participating in an augmented reality experience that includes obtaining or providing a printed media member that includes at least a first image target that includes first linked augmented reality content, obtaining or providing a head mounted device that includes a mobile device securing member, obtaining or providing a mobile device with a camera that has a camera lens that includes software running thereon that is in communication with a target database, securing the mobile device in the head mounted device using the mobile device securing member, and orienting the mobile device such that the camera lens is directed toward the printed media member. When the first image target is recognized by the software the first linked augmented reality content is displayed on the mobile device. The method also includes viewing the first linked augmented reality content through the head mounted device.

In a preferred embodiment, the first linked augmented reality content is displayed in first and second screen frames on the screen of the mobile device. The head mounted device includes first and second lenses. The viewing step of the method includes viewing the first and second screen frames through the first and second lenses. Preferably, the printed media member includes at least first and second pages where the first image target is disposed on the first page and the second page includes a second image target that includes second linked augmented reality content. The printed media member can include any number of pages and any number of image targets.

In a preferred embodiment, the printed media member and head mounted device are part of a kit and the method includes the step of obtaining at least a first instrument that is part of the kit. The first linked augmented reality content includes audio that directs a user to utilize the first instrument. Preferably, the method also includes obtaining or providing at least a second instrument that is not part of the kit and the first linked augmented reality content includes audio that directs a user to utilize the second instrument. In a preferred embodiment, the method includes the step of obtaining at least a first instrument that is part of the kit and the first linked augmented reality content includes audio that directs a user to utilize the first instrument. Preferably, the method includes obtaining or providing at least a second instrument that is not part of the kit and the second linked augmented reality content includes audio that directs a user to utilize the second instrument. In other words, the use of the instruments whether they are part of the kit or not can be associated with one or more image targets and the augmented reality content associated therewith.

In a preferred embodiment, the first linked augmented reality content is one of three-dimensional type augmented reality content or two-dimensional type augmented reality content. The two-dimensional type augmented reality content may augment within a frame located on the printed media member. The frame may not be an actual visible frame. However, the video appears to play within a certain space on the page. In a preferred embodiment, the first linked augmented reality content is three-dimensional type augmented reality content and the second linked augmented reality content is two-dimensional type augmented reality content that augments within a frame located on the printed media member.

In accordance with another aspect of the present invention there is provided an augmented reality system that includes a printed media member that has at least a first image target, a head mounted device that includes a mobile device securing member, and software that is configured to run on a mobile device that includes a camera that has a camera lens. The software is in communication with a target database (either on a remote server or within the software) that includes information related to the first image target, and wherein the software includes first augmented reality content that is associated with the first image target.

In a preferred embodiment, the printed media member and head mounted device are part of a kit that also includes at least first and second instruments. Preferably, the first augmented reality content includes audio instructions regarding a first task that includes use of the first instrument. In a preferred embodiment, the first augmented reality content also includes audio instructions regarding a second task that includes the use of a third instrument that is not part of the kit. In a preferred embodiment, the printed media member includes a second image target, the target database includes information related to the second image target, and second augmented reality content that is associated with the second image target is part of the software. Preferably, the second augmented reality content includes audio instructions regarding a third task that includes use of the second instrument.

In a preferred embodiment, the first augmented reality content includes video related to the first task that augments within a frame located on the printed media member. Preferably, the video includes a demonstration using the first instrument. It will be appreciated that the first instrument is not the exact same instrument that came with the kit, but is the same type of instrument. For example, if the first instrument is a measuring cup that came with the kit, the first instrument in the video is a similar measuring cup.

In a preferred embodiment, the present invention includes a kit and system that includes a book, virtual reality ("VR") goggles, a set of instruments and a software application ("app"). Generally, a user downloads the app to their mobile device/smartphone, tablet or the like, places the smartphone in the goggles so that the camera on the smartphone is exposed, opens the book and participates in an augmented reality ("AR") experience when the app recognizes targets on the pages of the book. It will be appreciated that, in a preferred embodiment, the goggles are not actually VR goggles, meaning they do not include VR capability built in to the goggles. Instead, the goggles (helmet or other head mounted device) include the ability to secure a smartphone or other portable electronic device therein. The app can also have the capability of not showing the video in split screen mode so that it can be viewed directly on the screen of the phone and without having to use goggles.

Generally, target-based augmented reality devices ("AR device") allow users to view information linked to image targets identified by the devices in real time. In the present invention, the AR device is a mobile device, which may be a smart phone (e.g., iPhone, Google phone, or other phones running Android, Windows Mobile, or other operating systems), a tablet computer (e.g., iPad, Galaxy), personal digital assistant (PDA), a notebook computer, or various other types of wireless or wired computing devices, that includes associated software running thereon (typically in the form of an app). As described herein, the AR device is coupled or paired with the goggles or other head mounted device so that the user can view the content on the screen of the AR device and be provided a simultaneous real-world view. The mobile device (AR device) together with the goggles (head mounted device) are referred to herein as the AR assembly.

As discussed above, the VR goggles are used for an AR experience and can also be used for a VR experience. In an exemplary embodiment of the invention, the AR experience involves an educational chemistry or science lesson or lessons that takes place on the pages of the book. However, this is not a limitation on the present invention. Throughout the specification and drawings the exemplary kit and systems are part of Professor Maxwell's 4D Chemistry. However, this is only used as an example, and the principles of the present invention can be used for other projects, lessons and the like.

In use, upon launch of the Professor Maxwell's 4D Lab app, the user chooses the program for the proper product (e.g., Professor Maxwell's 4D Chemistry). The user then places the smartphone into the goggles. Next, once the book is opened to the first page and the user "looks at" the page through the goggles and the app, via the camera, the app recognizes via scanning an AR target on the page and the app renders or augments the AR content on the screen of the smartphone (or other AR device). In a preferred embodiment, For example, the AR content rendered by the first target may be Professor Maxwell giving an introduction to the lesson. As different AR targets are scanned and recognized, different AR content is rendered or augmented. For example, when the second target is recognized, the second AR content may be two glasses with the professor telling the user to fill the physical two glasses (which are part of the instruments) as part of the experiment and lesson. In other words, the app scans/reads the page in front of the user and triggers the professor to "come alive" on the page and begin his introduction about the specific project and then walk through the steps of the lesson. In a preferred embodiment, the passive scanning allows users to be relieved of the need to actively search for the AR targets. Instead, as soon as a target is scanned the AR content is augmented and displayed on the smartphone screen and viewed by the user through the goggles. Augmented reality target detection is taught in U.S. Pat. No. 9,401,048, the entirety of which is incorporated herein by reference.

In the Professor Maxwell 4D Lab, each book includes one or more lesson plans that are each a unique, educational and lesson based product, in which the professor has a specific agenda per project. Each separate project or lesson can be on a single or multiple pages. For example, in the project "Dancing Paper," the user learns about static electricity, as it is explained by the professor. Each step by step instruction by the professor is in AR, so once the user starts the project, the user watches the professor bring each of the steps "to life," showing the user the step by step instructions as he is animated and walks around the page explaining to the user the steps of the process.

As discussed above, during the process, the professor may instruct the user to use the instruments that come in the kit. Some of the instruments necessary for the project can be provided by the user. For example, in a lesson regarding how to color a flower using science the flower may be provided by the user. The other instruments, can be, for example, a set of science materials, e.g., beakers, test tubes, baking soda, magnifying glass, etc. Some or all of the instruments are preferably related to a separate project or lesson within the set, and are used with the book, app and goggles.

Generally, the goggles include a hollow main body portion and a holder, clamp or support member that is spaced from the main body portion define a phone slot therebetween for mounting a smartphone therein. Preferably, the goggles also include lenses, and a strap, or other component for securing the goggles to the user's head.

It will be appreciated by those of ordinary skill in the art that the present invention is a lesson based teaching tool used in a hands-free augmented reality framework that is achieved by a set of VR goggles that exposes the camera of a smartphone, allowing the split-screen function to immerse the user into an augmented reality environment. The book, the app, the step-by step AR, the instruments, etc. all combine to provide, in an exemplary embodiment, a professor that appears in the room with the user, walking around and teaching the user.

DETAILED DESCRIPTION OF THE PREFERRED EMBODIMENTS

Figure 1:
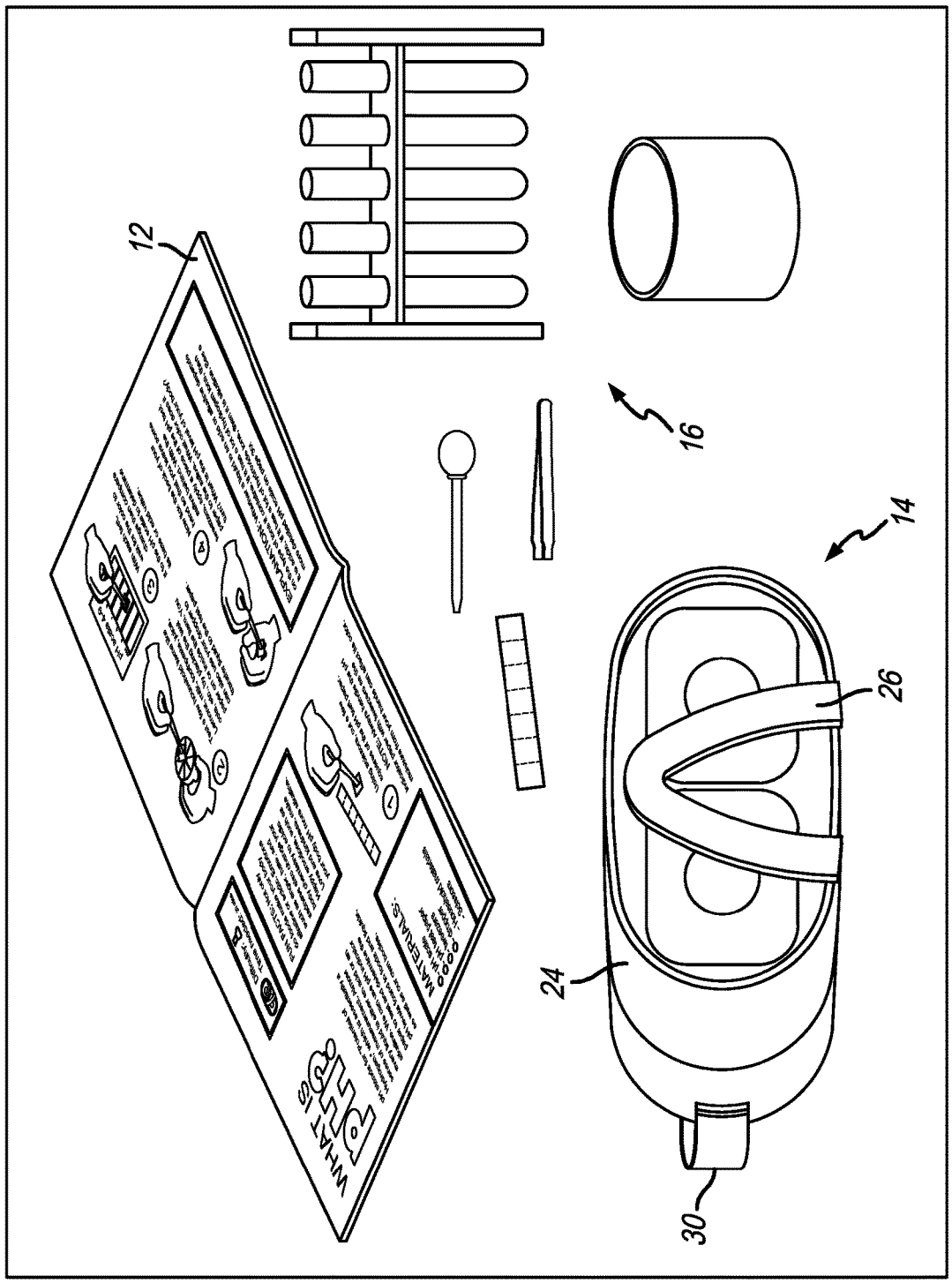
FIG. 1 is a schematic view of a number of components of a kit for the system of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

The detailed description provides explanations by way of exemplary embodiments. It is to be understood that other embodiments may be used having mechanical and electrical changes that incorporate the scope of the present invention without departing from the spirit of the invention.

While certain embodiments of the present invention are described in detail above, the scope of the invention is not to be considered limited by such disclosure, and modifications are possible without departing from the spirit of the invention as evidenced by the following claims.

Referring now to the drawings, wherein the showings are for purposes of illustrating the present invention and not for purposes of limiting the same, the drawings show components of an augmented reality system, at least a portion of which, can be provided to users in a kit 10 in accordance with preferred embodiments of the present invention.

As shown in FIG. 1, in a preferred embodiment, the kit 10 includes a printed media member 12, a head mounted device 14 and a plurality of instruments 16 that can be used during the augmented reality experience described herein. The printed media member 12 can be, for example, a book, poster, brochure, etc. The printed media member 12 can also be a .pdf or other electronic file that is viewable on a computer screen. The head mounted device 14 can be any device that is capable of being mounted on a user's head and securing a mobile device thereto. In a preferred embodiment, the head mounted device 14 is a pair of goggles, but could also be a helmet, headband or other head mounted device. For example, the kit 10 can be provided in a box that includes the goggles, book and plurality of instruments, such as beakers, a cup and an eye dropper, as shown in FIG. 1.

Figure 2:
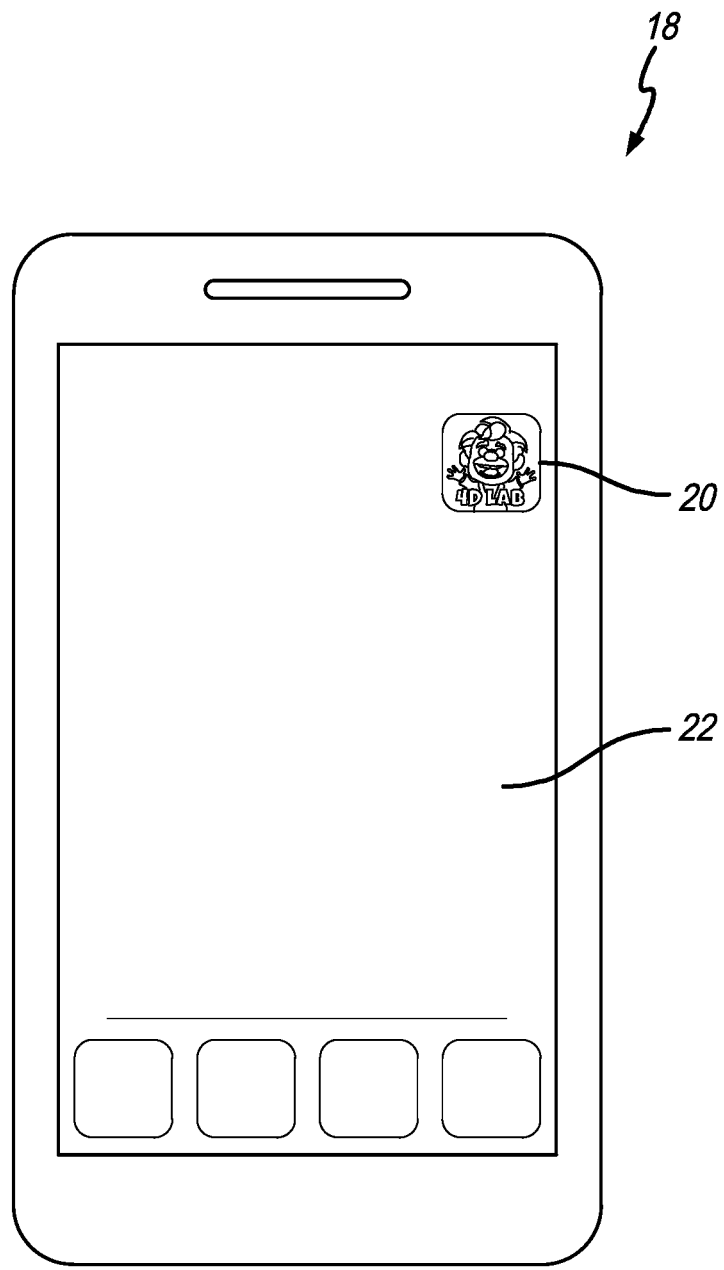
FIG. 2 is an elevational view of a mobile device that includes an app icon thereon that associated with the augmented reality system.
Figure 3A:
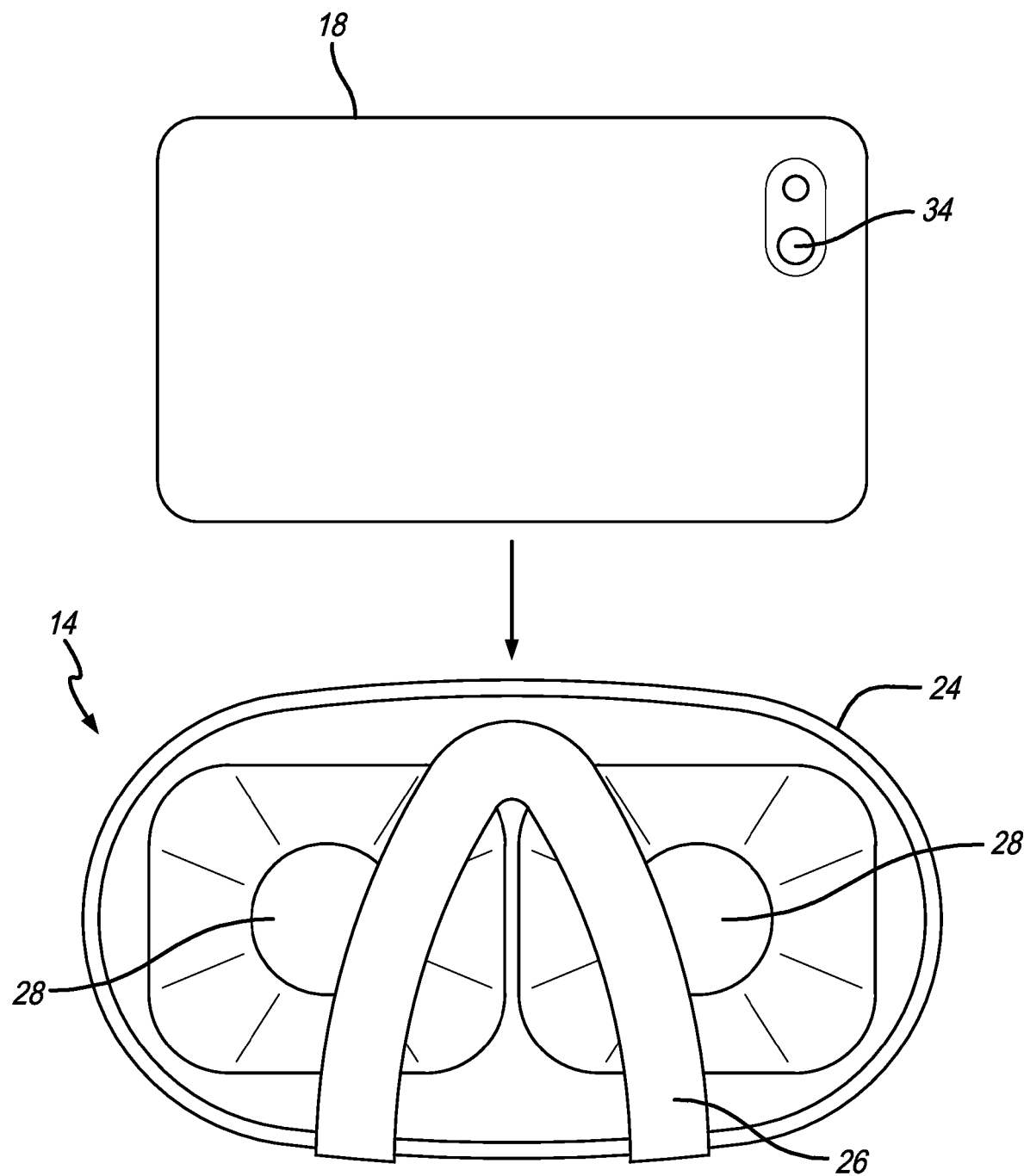
FIG. 3A is an exploded front elevational view of a head mounted device and mobile device.
Figure 3B:
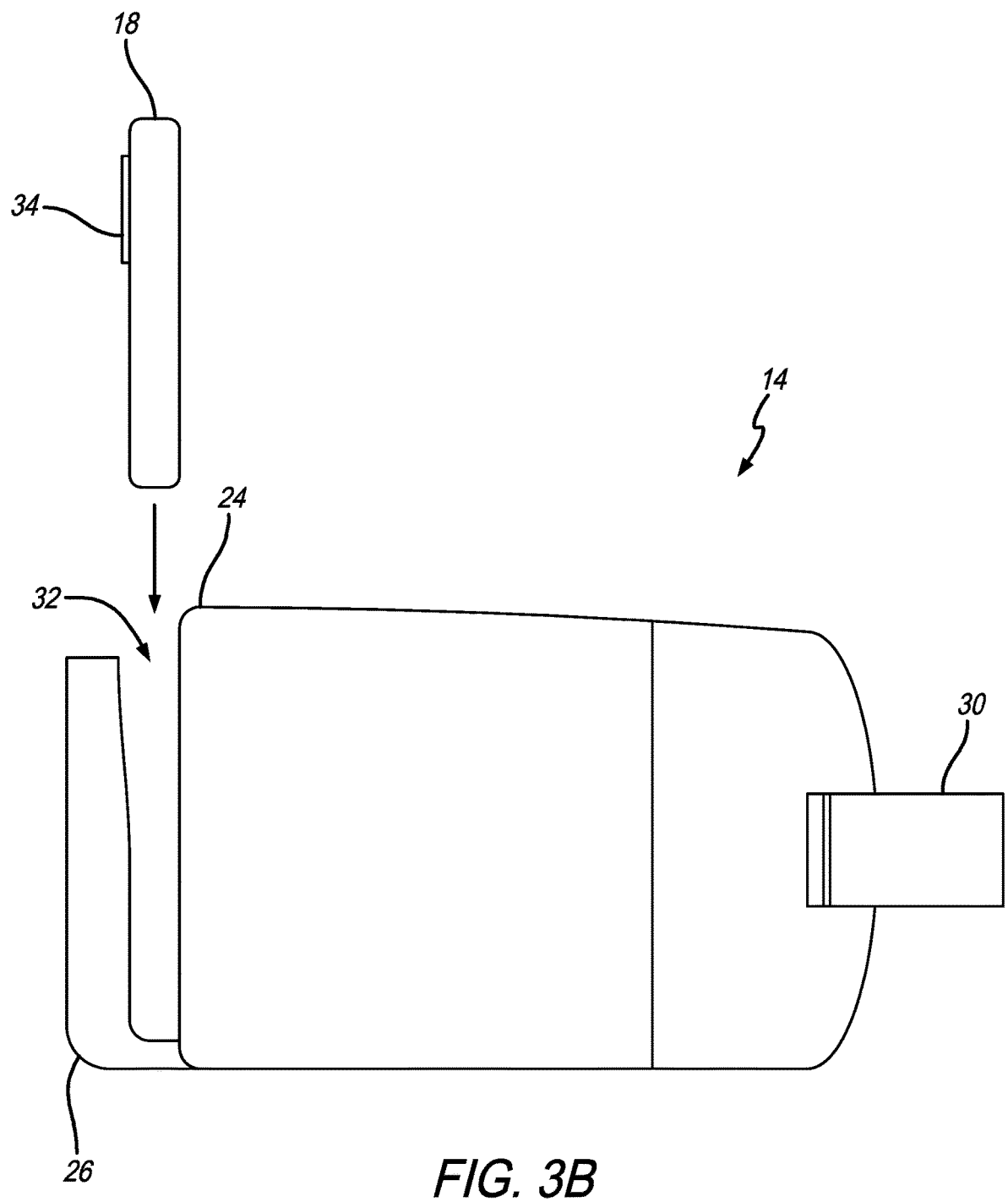
FIG. 3B is an exploded side elevational view of a head mounted device and mobile device.
Figure 4:
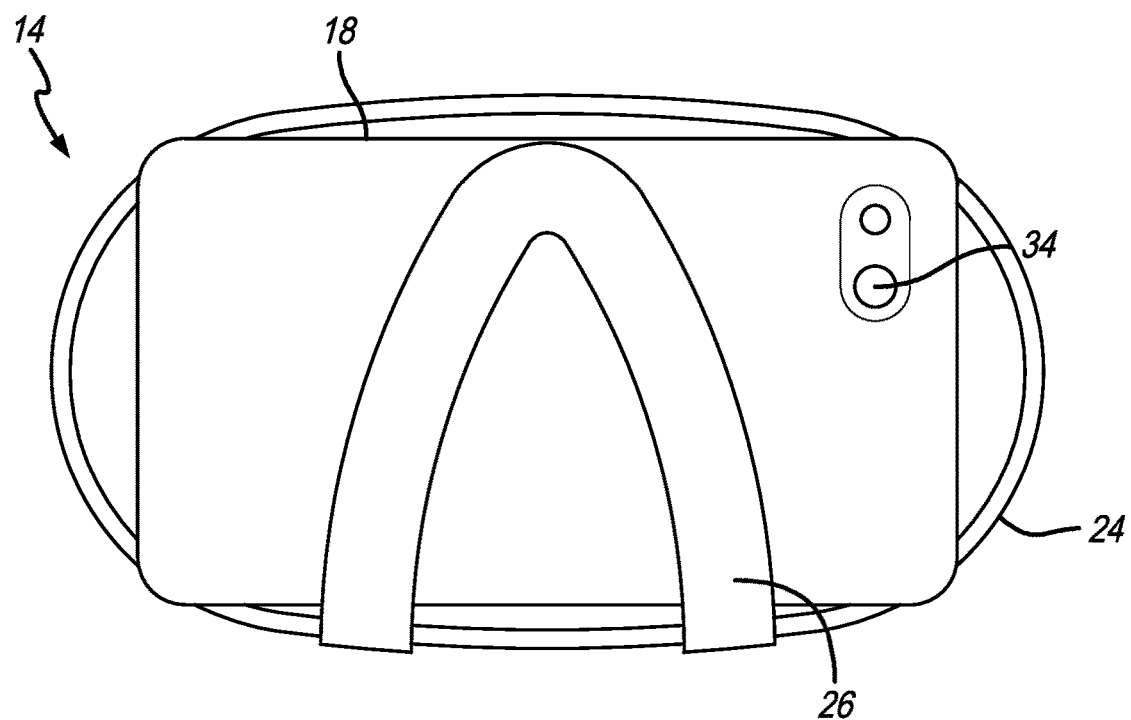
FIG. 4 is a front elevational view of the mobile device secured in the head mounted device.

As discussed herein, in a preferred embodiment, the present invention includes software that can be downloaded to a mobile device 18 in the form of an app. FIG. 2 shows a mobile device 18 with an exemplary app icon 20 thereon that is associated with the software program. As is shown in FIGS. 3A-4, in use, the mobile device 18 is secured to the head mounted device 14 so that the screen 22 of the mobile device 18 is viewable by the user when the head mounted device 14 is placed on the user's head. In a preferred embodiment, the head mounted device 14 includes a main body portion 24, a securing member 26, first and second lenses 28 and a strap 30. As shown in FIG. 3B, a securing space 32 is defined between the securing member 26 and the main body portion 24. It will be appreciated that the securing member can be any component that secures the mobile device to the head mounted device. For example, the securing member can be a strap, elastic band or the like and can include Velcro, snaps, tabs or other components for securing the mobile device. As shown in FIG. 4, when properly positioned in the head mounted device 14, the camera lens 34 of the mobile device 18 is exposed so that it can view the printed media member 12, as discussed below.

Figure 5:
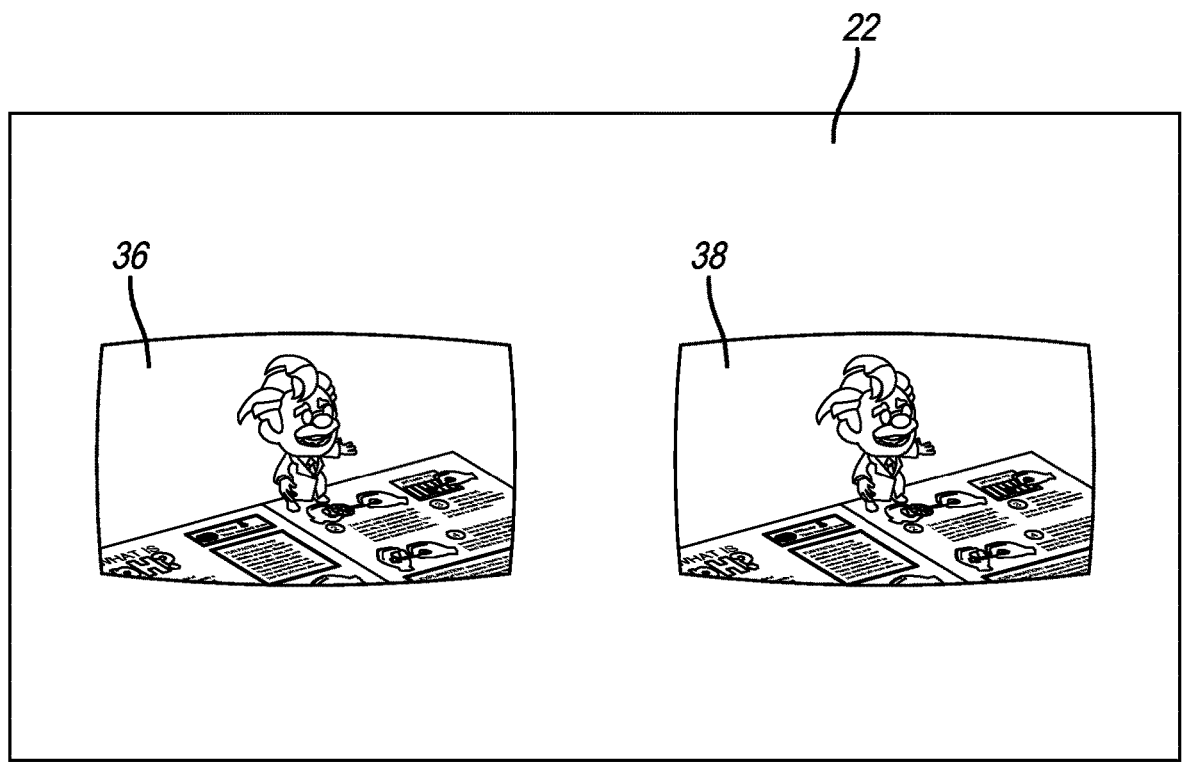
FIG. 5 is a view of the mobile device screen showing the first and second screen frames.

As shown in FIG. 5, in a preferred embodiment, the software includes the capability of displaying the video in split screen mode, which includes a first screen frame 36 and a second screen frame 38. It will be appreciated by those of ordinary skill in the art that the first screen frame 36 is viewable by the first lens 28 and the second screen frame 38 is viewable by the second lens 28 for stereoscopic viewing to provide a 3D image.

Figure 6:
FIG. 6 is a plan view of exemplary pages of the printed media member.
Figure 7:
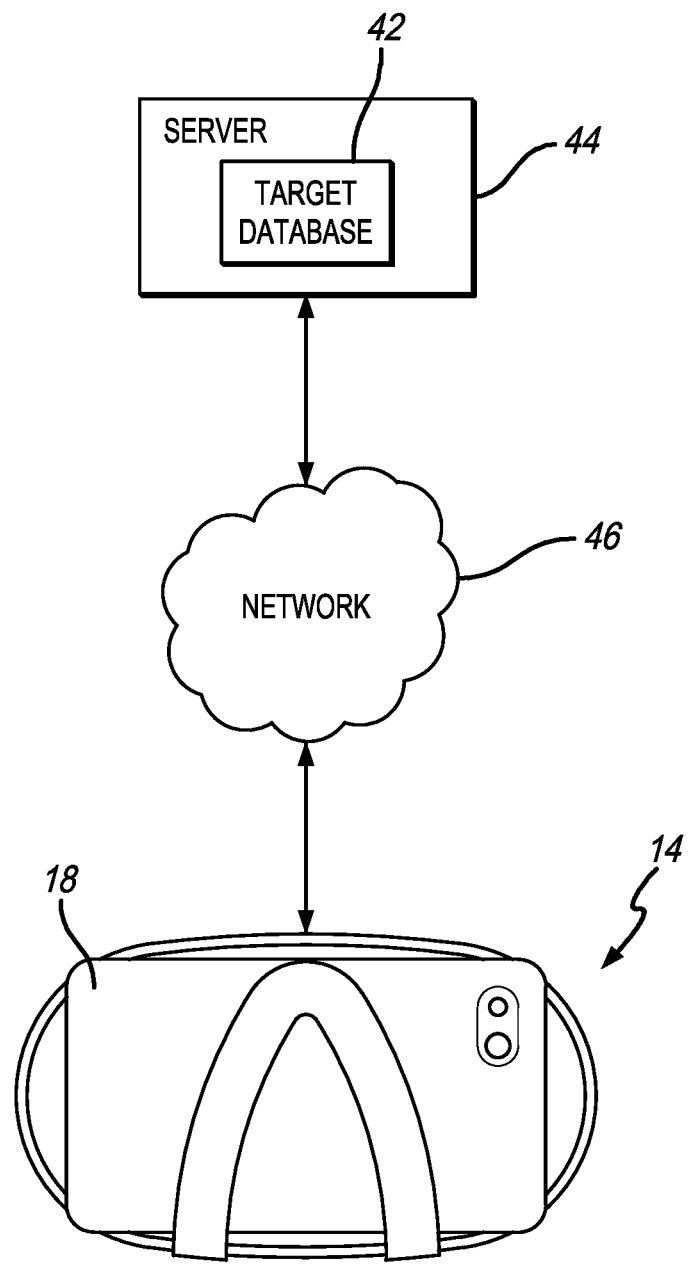
FIG. 7 is block diagram showing the augmented reality system in communication through a network with a remote target database.

With reference to FIGS. 6 and 7, in a preferred embodiment, the printed media member 12 includes at least first and preferably a plurality of image targets 40. In use, the image targets 40 are recognized by the software and, as a result of being recognized, prompt or cause certain actions to take place. As shown in FIG. 7, the system includes a target database 42. In a preferred embodiment, the target database is part of the software program downloaded to the mobile device 18. However, in another embodiment, the target database 42 can be stored on a remote server 44 or the like that is accessible via a network 46, such as the internet.

Figure 8:
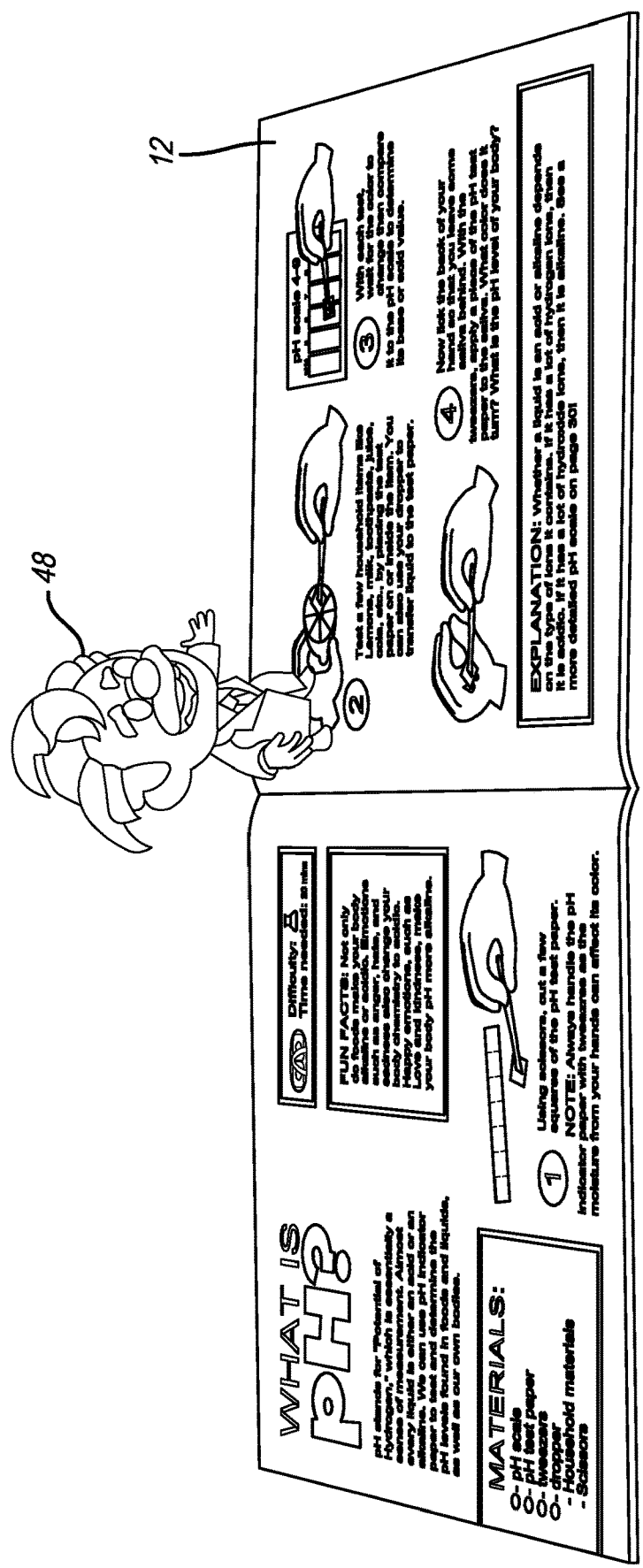
FIG. 8 is an exemplary view that a user would see when viewing the printed media member through the head mounted device and mobile device.

Each image target 40 includes augmented reality content or virtual reality content linked thereto or associated therewith. As will be appreciated by those of ordinary skill in the art, the image targets can be any of the printed material that is recognized by the software. The image targets can be a particular picture, drawing, word or set of words. FIG. 8 includes two image targets 40 that cause linked augmented reality content to be augmented, displayed, activated or sounded.

In use, when an image target 40 is recognized the associated augmented reality content is displayed on the screen. For example, see FIG. 8, which shows an exemplary Professor Maxwell 48 as the displayed augmented reality content. Because the viewer can also see the printed media member 12 through the head mounted device 14, it appears that Professor Maxwell 48 is standing on the printed media member 12 (as shown in FIG. 8). The augmented reality content may also include audio. For example, each image target 40 may cause Professor Maxwell 48 to make a series of moves and say a particular set of words.

As discussed above, in a preferred embodiment, the kit 10 includes instruments 60. The instruments 60 are associated with the theme of the kit, e.g., science, chemistry, cooking, etc. An example will be provided using the Professor Maxwell's 4D Chemistry. After opening the app (activating the software), placing the mobile device 18 in the securing space 32 and donning the goggles 14, the book 12 is opened to the first page that includes an image target 40. When the image target 40 is recognized by the software via the camera and camera lens on the mobile device the Professor Maxwell related augmented reality content is rendered. Professor Maxwell may tell the user to take one of the instruments 16 and perform a task. The exemplary instruments shown in FIG. 1 are a Ph test paper strip, a cup, tweezers, a set of test tubes and a dropper. For example, the first image target 40 shown in FIG. 6 includes associated augmented reality content where Professor Maxwell 48 tells the user to use scissors to cut a few squares of the pH test paper. The user then takes the test paper strip that was provided with the kit and does what is told by Professor Maxwell. This can be done while still wearing the goggles. In other words, at least some of the image targets 40 have one or more tasks or projects associated with them and/or have one or more instruments for performing the task(s) associated with them.

After cutting the test paper, Professor Maxwell then tells the user to test a few household items, e.g., lemon, milk, toothpaste, etc., using the cut piece of test paper. This task can be performed with the tweezers and/or the dropper. Some of the other instruments or items used with the system can be items that are not provided with the kit. At this point, as the user turns their head the software may recognize the second image target 40 shown in FIG. 6, and the linked augmented reality content can be displayed and Professor Maxwell continues to explain the next task or step in the experiment. In a preferred embodiment, as soon as the page is turned to the next page in the book, the next image target is recognized and the associated content is animated or rendered. Preferably, even if the first augmented reality content has not finished playing the second augmented reality content begins playing as soon as the second image target is recognized.

In an embodiment where the theme is chemistry, the instruments can be at least one of test tubes, a funnel, tweezers, a dropper, beaker, string, a test tube rack, test tube holder and stopper, magnet, pH test chart, a cup, a measuring cup, a measuring spoon, bottle(s) of food coloring, pH test strips, Styrofoam, a magnifying glass and other chemistry related instruments and the tasks or projects can be one or more of testing copper coins, making egg tattoos, making a compass, making perfume, mixing oil and water, performing soapy tricks, making rock candy, making an erupting rainbow, making sticky ice and testing pH. In an embodiment where the theme is general science, the instruments can be at least one of a plastic volcano mold, a dropper, a cup, a measuring cup, a measuring spoon, beaker, bottle(s) of food coloring, a marker, a paint brush, a glue, mirror, filter paper, salt, washers, string, a rubber band, balloons and other science related instruments and the tasks or projects can be one or more of making sticky slime, making a volcano eruption, making a lava lamp, making dancing paper, extracting color from water, making a colored flower, creating a magic message, making a rainbow, making radical crystals and trapping gas in a balloon.

Figure 9:
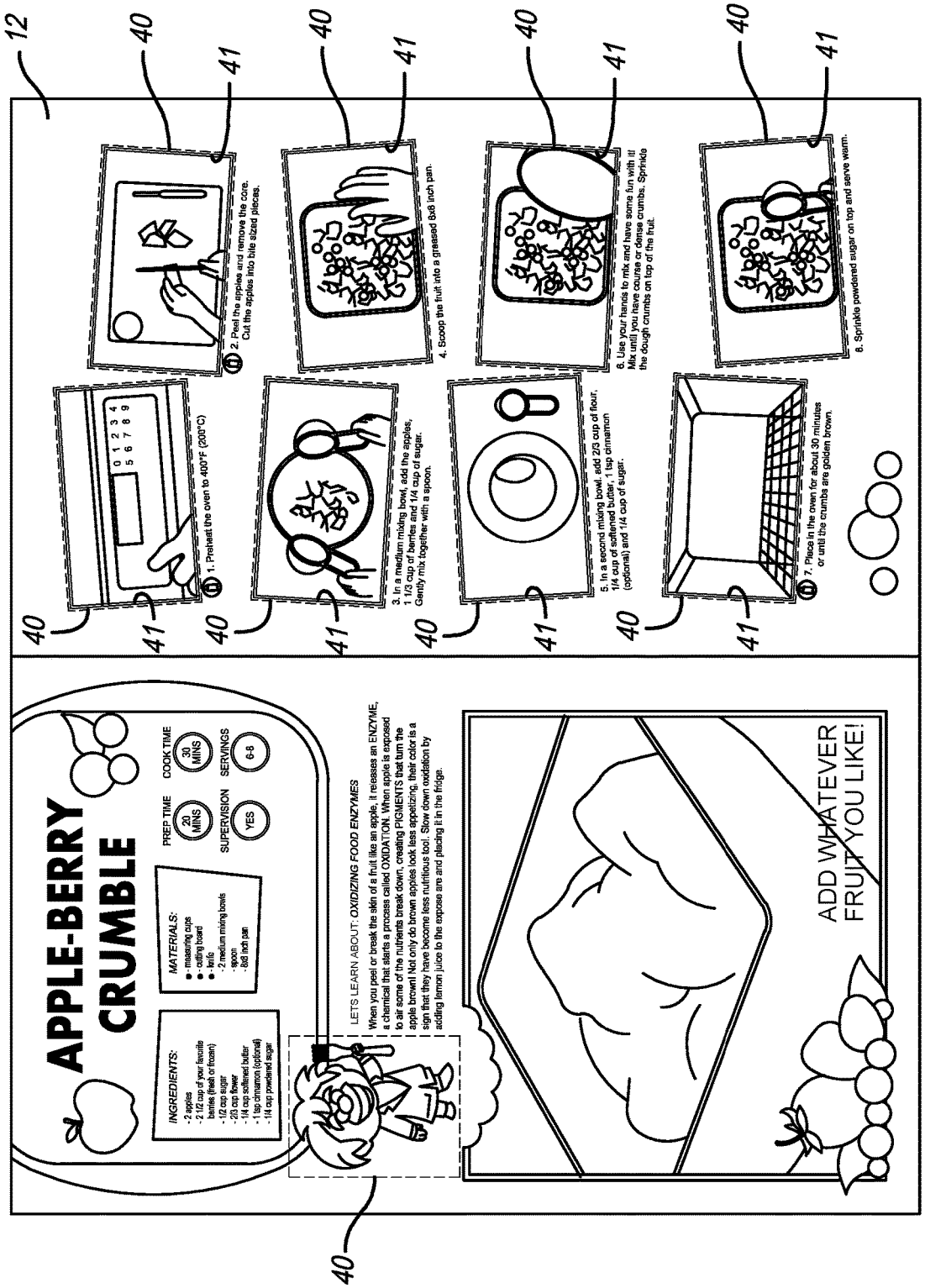
FIG. 9 is a plan view of exemplary pages of a printed media member in accordance with another preferred embodiment of the present invention.

FIG. 9 shows an exemplary printed media member 12 in accordance with another preferred embodiment of the present invention. In this example, the subject matter is baking/cooking and not chemistry. In this embodiment, the printed media member 12 includes augmented reality content that looks 3D when viewed, similar to Professor Maxwell 48 shown in FIG. 8, and augmented reality content that appears to play within a frame 41. As shown in FIG. 9, the image target 40 on the left page augments Professor Maxwell to teach the user about oxidizing food enzymes. However, the image targets 40 on the right page augment such that they appear to be playing within the frame 41. For example, the image target 40 for each video that is recognized can be the first frame or image of the video. In FIG. 9, the videos are related to the steps for making an apple-berry crumble. FIG. 9 includes eight videos showing eight steps for making the apple-berry crumble. When the user directs the goggles and phone toward the image target 40 associated with step 1 and the image target 40 is recognized, the video is animated or augmented and appears to play within the frame 41 associated with step 1. A different video is associated with and played for each of the steps as the associated image target is recognized. As used herein, the type of augmented reality associated with Professor Maxwell and the like is referred to as three-dimensional type augmented reality content because the content appears three-dimensional to the user, as shown in FIG. 8. As used herein, the type of augmented reality associated with the frames 41 and the like is referred to as two-dimensional type augmented reality content because the content appears two-dimensional to the viewer as it plays within the frame located on the page of the printed media member, as shown in FIG. 9.

The videos associated with each step may demonstrate to the user how to use the instruments associated with the task. For example, if the instrument is a measuring cup (which may be an instrument that comes with the kit), the subject video can show someone measuring out an amount of an ingredient in the measuring cup and then pouring it into a pot (which may be an instrument that does not come with the kit). the two-dimension type augmented reality content can also include audio explaining the steps. In another embodiment, three-dimensional type augmented reality content (e.g., Professor Maxwell) may play at the same time as the two-dimensional type augmented reality content (e.g., video showing a step in the task). For example Professor Maxwell may explain what is happening in the video playing within a frame.

Figure 11:
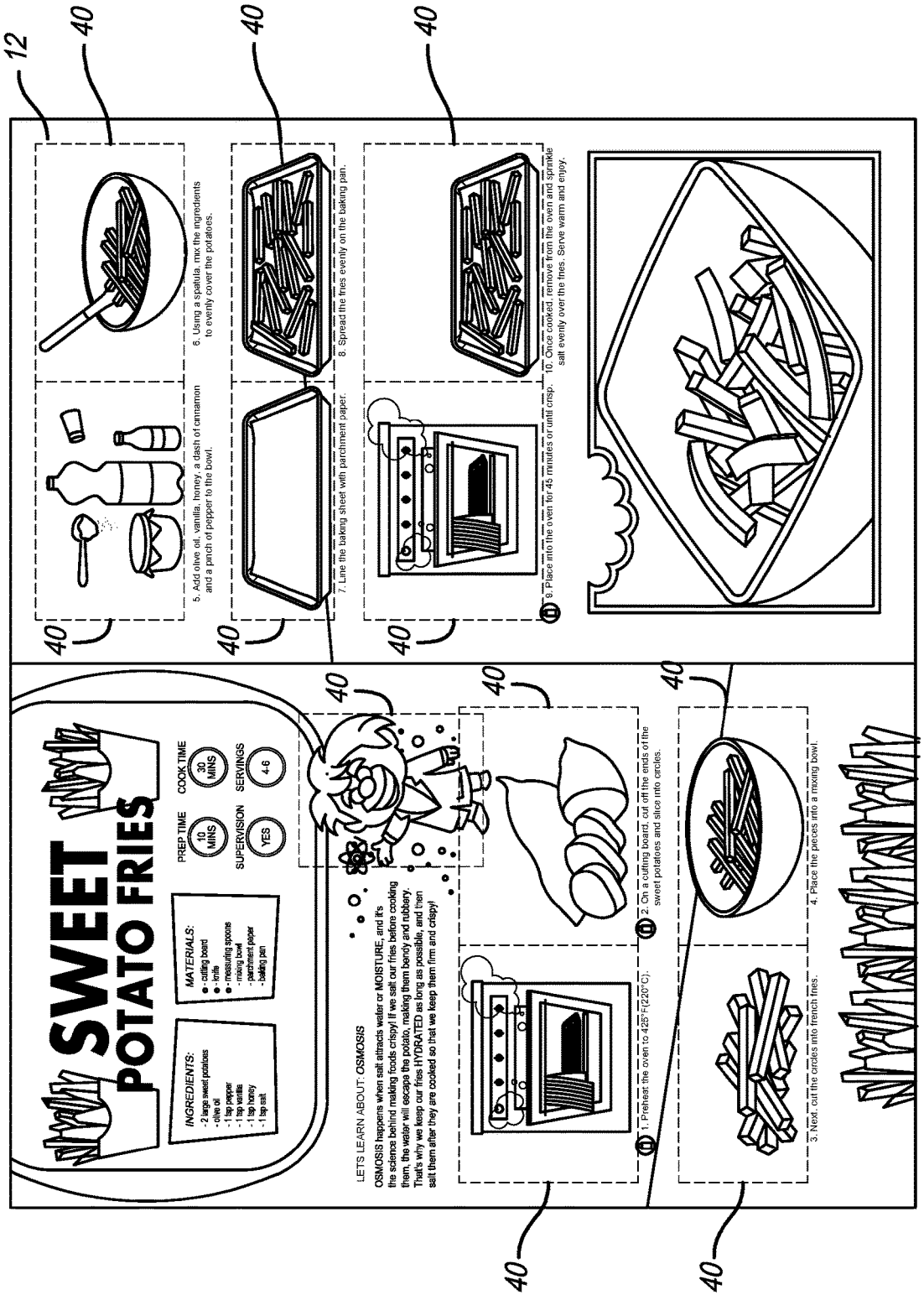
FIG. 11 is a plan view of exemplary pages of a printed media member in accordance with another preferred embodiment of the present invention.
Figure 12:
FIG. 12 is a view of the mobile device screen showing a virtual reality video thereon.

FIGS. 11 and 12 show another aspect of the present invention that includes a virtual reality component thereto. As described herein, in an augmented reality experience, the augmented reality content can be viewed by the user (through the goggles or on their mobile device), but the user can also see the printed media member (and other things therearound) as captured by the camera of the mobile device. Therefore, the augmented reality content appears to play on the printed media member. However, in a virtual reality experience the camera of the mobile device is not activated and the user cannot see the printed media member any longer. Instead, the content that is rendered is a virtual reality video where the user is immersed therein.

FIG. 11 shows another exemplary printed media member 12 that includes the lesson steps via virtual reality content. In this embodiment, the printed media member 12 includes augmented reality content that looks 3D when viewed, similar to Professor Maxwell 48 shown in FIG. 8, and virtual reality content that plays on the user's mobile device. As shown in FIG. 11, the image target 40 on the left page augments Professor Maxwell to teach the user about osmosis. However, each of the image targets 40 associated with the ten steps in FIG. 11 causes virtual reality content to be augmented, displayed, activated or sounded and played on the screen of the mobile device (see FIG. 11). In FIG. 11, the virtual reality content is related to the steps for cooking sweet potato fries. FIG. 11 includes ten steps for making the sweet potato fries. Each of the steps include a drawing representing the step and include an image target 40. When the user directs the goggles and phone toward any of the image targets 40 associated with the ten steps and the particular image target 40 is recognized, a video is activated and plays on the phone. The difference from the aspect discussed above with respect to FIG. 9 is that the video shows all ten steps in a single video, as opposed to having to look at each step and the related image target separately for a separate video. In another embodiment, each step can include a different virtual reality video that is associated with each image target. The video shows all of ten of the steps in the process for making the sweet potato fries. The video(s) can be an animated video or can be an actual video that is filmed of people performing the steps. And, because the video is filmed or created as a virtual reality video, when the user turns their head to "look around" (if wearing the goggles) or moves their phone (if just viewing on the screen of the phone), the user sees a different perspective within the site where the video takes place (e.g., the kitchen).

FIG. 12 shows an exemplary screen 22 of a mobile device 18 with a video playing thereon. The video demonstrates to the user how to perform each of the steps and how to use the instruments associated with the tasks. For example, the virtual reality content video may show two kids in a kitchen performing all of steps one through ten to make and cook the sweet potato fries. The virtual reality content can also include audio explaining the steps. Therefore, when using the book, the user can direct the camera towards the top left of the page and Professor Maxwell is activated to explain about osmosis. Then the user can direct the camera toward one of the steps in the process and a virtual reality video appears on the screen and walks the user through all of the steps for making the sweet potato fries.

As discussed above, the type of augmented reality associated with Professor Maxwell and the like is referred to as three-dimensional type augmented reality content because the content appears three-dimensional to the user, as shown in FIG. 8, the type of augmented reality associated with the frames 41 and the like is referred to as two-dimensional type augmented reality content because the content appears two-dimensional to the viewer as it plays within the frame located on the page of the printed media member, as shown in FIG. 9, and the content associated with the image targets that activate a full screen video is referred to as virtual reality content.

It will be appreciated by those of skill in the art that any type of computer can be used with the present invention. Generally, the invention includes a software application running on a device 18, which may or may not be in communication with a server 44 via a network 46. Network 46 may be implemented as a single network or a combination of multiple networks. For example, in various embodiments, network 46 may include the Internet and/or one or more intranets, wireless networks (e.g., cellular, wide area network (WAN), WiFi hot spot, WiMax, personal area network (PAN), Bluetooth, etc.), landline networks and/or other appropriate types of communication networks. As such, in various embodiments, computing device 18 may be associated with a particular link (e.g., a link, such as a URL (Uniform Resource Locator) to an IP (Internet Protocol) address). In one or more embodiments, mobile device 18 may use the remote target database 42 or may transmit the images to a remote server for image target identification.

Figure 10:
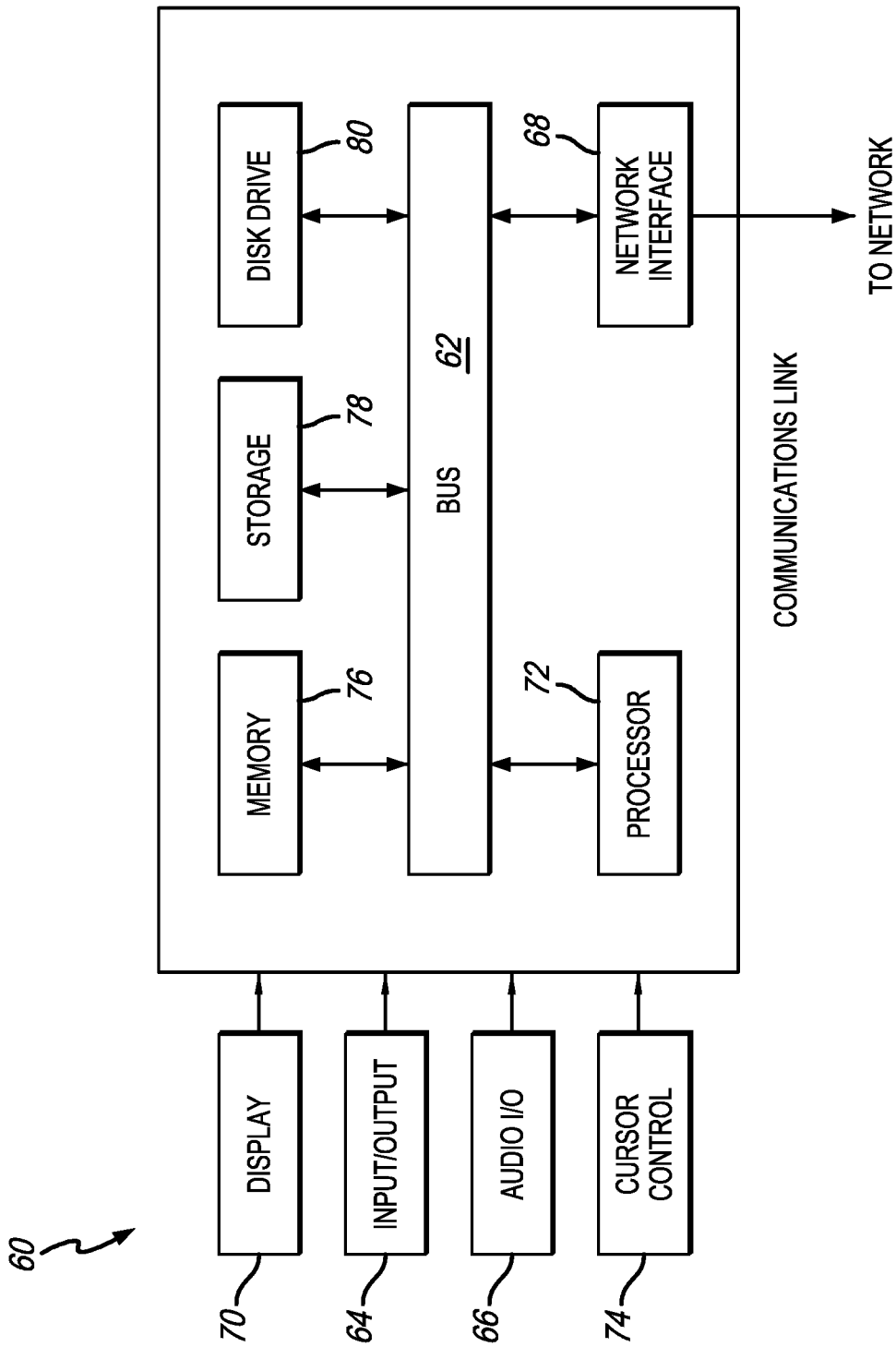
FIG. 10 is a block diagram of a computer system suitable for implementing one or more components discussed herein.

FIG. 10 is a block diagram of a computer system 60 (e.g., mobile device 18 or a head mounted device that includes the computer system built in) suitable for implementing one or more components discussed herein according to one embodiment of the subject matter of the present disclosure. In various implementations, mobile device 18 of the user may comprise a personal computing device (e.g., smart phone, a computing tablet, a personal computer, laptop, PDA, Bluetooth device, key FOB, badge, etc.) capable of communicating with the network. In an embodiment of the invention where the VR/AR assembly is implemented in a single head mounted device or HMD 14, HMD 14 may comprise a personal computing device incorporated into a pair of glasses or a helmet. HMD 14 may comprise or implement a plurality of hardware components and/or software components that operate to perform various methodologies in accordance with the described embodiments. Exemplary HMD 14 may include, for example, stand-alone and networked computers running mobile OS.

Computer system 60 includes a bus 62 or other communication mechanism for communicating information data, signals, and information between various components of computer system 60. Components include an input/output (I/O) component 64 that processes a user action, such as selecting keys from a virtual keypad/keyboard, selecting one or more buttons or links, etc., and sends a corresponding signal to bus 62. I/O component 64 may also include an output component such as a display medium 70 mounted a short distance in front of the user's eyes, and an input control such as a cursor control 74 (such as a virtual keyboard, virtual keypad, virtual mouse, etc.). An optional audio input/output component 66 may also be included to allow a user to use voice for inputting information by converting audio signals into information signals. Audio I/O component 66 may allow the user to hear audio. A transceiver or network interface 68 transmits and receives signals between computer system 60 and other devices, such as another user device, or another network computing device via a communication link to a network. In one embodiment, the transmission is wireless, although other transmission mediums and methods may also be suitable. A processor 72, which can be a micro-controller, digital signal processor (DSP), or other processing component, processes these various signals, such as for display on computer system 60 or transmission to other devices via communication link. Processor 72 may also control transmission of information, such as cookies or IP addresses, to other devices.

Components of computer system 60 also include a system memory component 76 (e.g., RAM), a static storage component 78 (e.g., ROM), and/or a disk drive 80. Computer system 60 performs specific operations by processor 72 and other components by executing one or more sequences of instructions contained in system memory component 76. Logic may be encoded in a computer readable medium, which may refer to any medium that participates in providing instructions to processor 72 for execution. Such a medium may take many forms, including but not limited to, non-volatile media, volatile media, and transmission media. In various implementations, non-volatile media includes optical, or magnetic disks, or solid-state drives; volatile media includes dynamic memory, such as system memory component 76; and transmission media includes coaxial cables, copper wire, and fiber optics, including wires that comprise bus 62. In one embodiment, the logic is encoded in non-transitory computer readable medium. In one example, transmission media may take the form of acoustic or light waves, such as those generated during radio wave, optical, and infrared data communications.

In various embodiments of the present disclosure, execution of instruction sequences to practice the present disclosure may be performed by computer system 60. In various other embodiments of the present disclosure, a plurality of computer systems 60 coupled by communication link to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, firmware, or combinations thereof. Also where applicable, the various hardware components, software components, and/or firmware components set forth herein may be combined into composite components comprising software, firmware, hardware, and/or all without departing from the spirit of the present disclosure. Where applicable, the various hardware components, software components, and/or firmware components set forth herein may be separated into sub-components comprising software, firmware, hardware, or all without departing from the spirit of the present disclosure. In addition, where applicable, it is contemplated that software components may be implemented as hardware components, and vice-versa. Where applicable, the ordering of various steps described herein may be changed, combined into composite steps, and/or separated into sub-steps to provide features described herein.

Although embodiments of the present disclosure have been described, these embodiments illustrate but do not limit the disclosure. It should also be understood that embodiments of the present disclosure should not be limited to these embodiments but that numerous modifications and variations may be made by one of ordinary skill in the art in accordance with the principles of the present disclosure and be included within the spirit and scope of the present disclosure as hereinafter claimed.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A method of participating in a virtual reality experience, the method comprising the steps of:
   (a) obtaining a kit that includes a printed media member and at least a first instrument, wherein the kit has a theme, wherein the first instrument is associated with the theme, and wherein the printed media member includes at least a first image target that includes first linked virtual reality content,
   (b) obtaining a mobile device that includes software running thereon that is in communication with a target database, wherein the first linked virtual reality content is associated with the software, wherein the first linked virtual reality content includes audio instructions that instruct the user how to utilize the first instrument, and wherein the first linked virtual reality content includes video instructions that instruct the user how to utilize the first instrument, wherein the mobile device includes a camera that has a camera lens,
   (c) orienting the mobile device such that the camera lens is directed toward the printed media member, wherein the first image target is recognized by the software and the first linked virtual reality content is displayed on the mobile device, and
   (d) viewing the first linked virtual reality content on a screen of the mobile device, such that the video instructions instruct the user how to utilize the first instrument and the audio instructions instruct the user how to utilize the first instrument.

2. The method of claim 1 wherein the printed media member includes at least first and second pages, wherein the first image target is disposed on the first page, wherein the second page includes a second image target that includes second linked virtual reality content.

3. The method of claim 2 wherein the method further comprises the step of obtaining at least a second instrument that is not part of the kit, and wherein the second linked virtual reality content includes audio that instructs the user how to utilize the second instrument.

4. The method of claim 1 wherein the kit is provided in a box.

5. The method of claim 1 wherein the video and audio instructions are related to at least one of cooking, science, chemistry or magic.

6. The method of claim 1 wherein the printed media member includes a second image target that includes first linked augmented reality content, wherein the method further comprises the steps of orienting the mobile device such that the camera lens is directed toward the printed media member, wherein the second image target is recognized by the software and the first linked augmented reality content is displayed on the mobile device, and viewing the first linked augmented reality content on the screen of the mobile device.

7. The method of claim 6 wherein the method further comprises the step of obtaining at least a second instrument, and wherein the first linked augmented reality content includes audio that instructs the user how to utilize the second instrument.

8. The method of claim 6 wherein the first linked augmented reality content is one of three-dimensional type augmented reality content and two-dimensional type augmented reality content that augments within a frame located on the printed media member.

9. The method of claim 1 wherein the kit includes a head mounted device that includes a mobile device securing member, wherein the method further comprises the steps of securing the mobile device in the head mounted device using the mobile device securing member, and viewing the first linked virtual reality content through the head mounted device.

10. The method of claim 9 wherein the first linked virtual reality content is displayed in first and second screen frames, wherein the head mounted device includes first and second lenses, and wherein the step of viewing the first linked virtual reality content through the head mounted device includes viewing the first and second screen frames through the first and second lenses.

11. A virtual reality system comprising:
    a kit that includes a printed media member and at least a first instrument, wherein the kit has a theme, wherein the first instrument is associated with the theme, and wherein the printed media member includes at least a first image target, and
    software that is configured to run on a mobile device that includes a camera that has a camera lens, wherein the software is in communication with a target database that includes information related to the first image target, wherein the software includes first virtual reality content that is associated with the first image target, wherein the first virtual reality content includes audio instructions and video instructions, wherein when the first virtual reality content is displayed on the mobile device, the audio instructions instruct a user how to utilize the first instrument and the video instructions demonstrate to the user how to utilize the first instrument.

12. The virtual reality system of claim 11 wherein the kit is provided in a box.

13. The virtual reality system of claim 11 wherein the video and audio instructions are related to at least one of cooking, science, chemistry or magic.

14. The virtual reality system of claim 11 wherein the first virtual reality content includes audio instructions regarding a first task that includes the use of a second instrument that is not part of the kit.

15. The virtual reality system of claim 14 wherein the printed media member includes a second image target, wherein the target database includes information related to the second image target, wherein the software includes second virtual reality content that is associated with the second image target.

16. The virtual reality system of claim 15 wherein the second virtual reality content includes audio instructions regarding a second task that includes use of a third instrument that is part of the kit.

17. The augmented reality system of claim 11 wherein the first virtual reality content includes video related to a first task that is associated with the theme.

18. The virtual reality system of claim 11 wherein the first virtual reality content includes video showing a demonstration using the first instrument.

19. The virtual reality device of claim 11 wherein the kit includes a head mounted device that includes a mobile device securing member.

20. A method of participating in a virtual reality experience, the method comprising the steps of:
    obtaining a kit that includes a printed media member and at least a first instrument, wherein the printed media member includes at least a first image target that includes first linked virtual reality content, wherein the printed media member includes at least first and second pages, wherein the first image target is disposed on the first page, wherein the second page includes a second image target that includes second linked virtual reality content,
    obtaining a mobile device that includes software running thereon that is in communication with a target database, wherein the mobile device includes a camera that has a camera lens,
    orienting the mobile device such that the camera lens is directed toward the printed media member, wherein the first image target is recognized by the software and the first linked virtual reality content is displayed on the mobile device,
    viewing the first linked virtual reality content through the head mounted device, wherein the first linked virtual reality content includes audio that directs a user to utilize the first instrument,
    obtaining at least a second instrument that is not part of the kit,
    orienting the mobile device such that the camera lens is directed toward the printed media member, wherein the second image target is recognized by the software and the second linked virtual reality content is displayed on the mobile device, wherein the second linked virtual reality content includes audio that directs a user to utilize the second instrument.

\* \* \* \* \*